Figure 1:
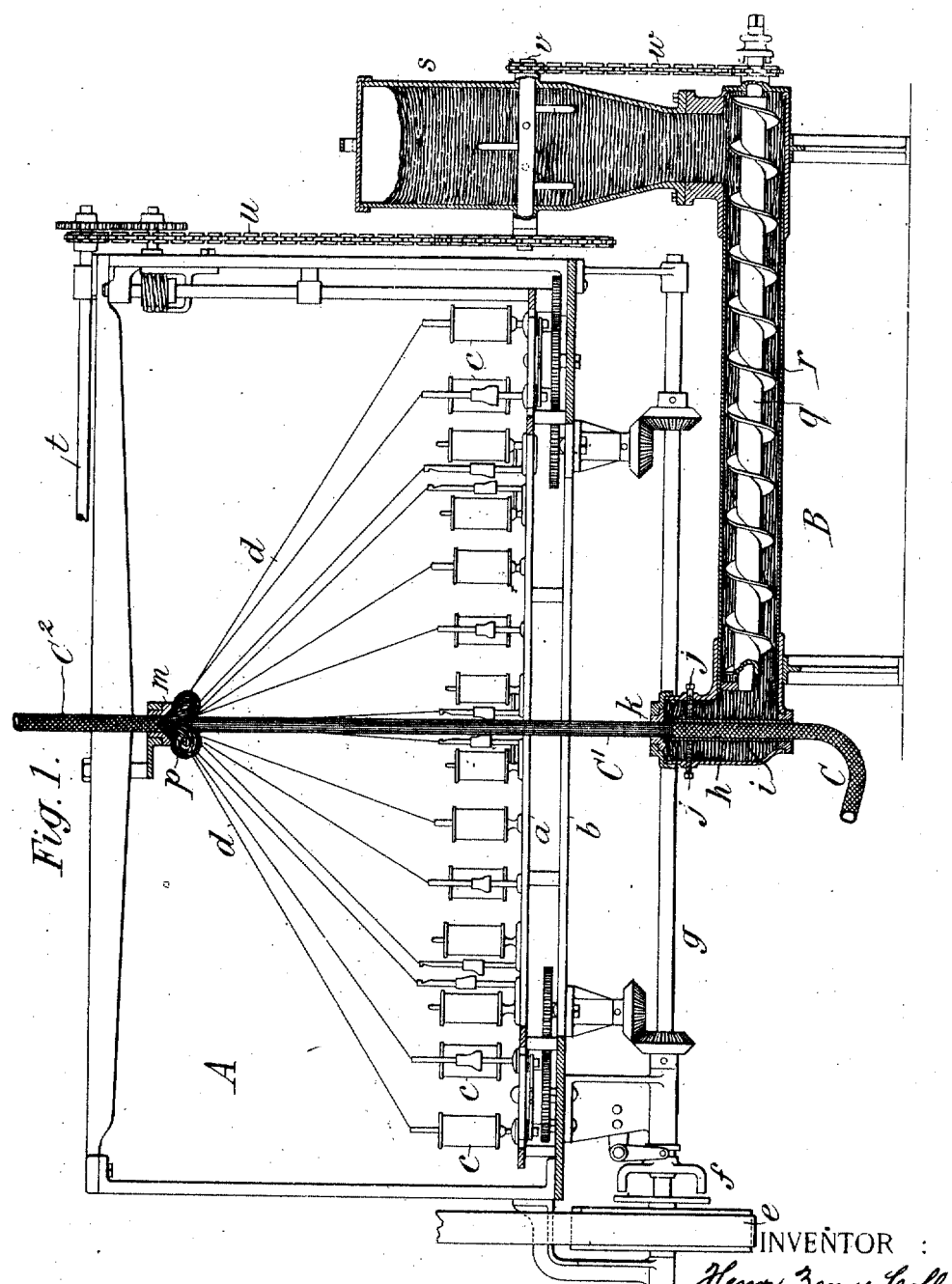

UNITED STATES PATENT OFFICE.

HENRY ZENAS COBB, OF WINCHESTER, MASSACHUSETTS, ASSIGNOR TO REVERE RUBBER COMPANY, OF BOSTON, MASSACHUSETTS, A CORPORATION OF RHODE ISLAND.

MANUFACTURE OF RUBBER HOSE.

1,002,644. Specification of Letters Patent. Patented Sept. 5, 1911.

Application filed February 25, 1911. Serial No. 610,670.

*To all whom it may concern:*

Be it known that I, HENRY ZENAS COBB, a citizen of the United States, residing at Winchester, in the county of Middlesex and State of Massachusetts, have invented certain new and useful Improvements in the Manufacture of Rubber Hose, of which the following is a specification.

This invention relates to the manufacture of rubber hose the fabric or textile layer or layers of which are braided or woven so as to form a continuous or seamless tubular web.

According to the present invention the inner or lining tube, which may or may not have already one or more layers or webs woven or braided upon it, is carried through a mass of plastic rubber composition, and is then introduced into the braiding machine or circular loom, whereby one or more layers or webs of textile fabric are braided or woven upon the coating so applied, after which the hose is passed through a die located just above the point at which the strands or yarns are woven or braided upon the hose, this die being small enough to remove an excess of the composition from the hose, so that this excess piles up beneath the die and forms a mass or "bank" through which the yarns freely move or cut their way as they are laid together in the braiding or weaving operation. It results from this process that each yarn while passing through this bank becomes thoroughly impregnated with the composition, and the braided or woven layer thus formed is consequently thoroughly permeated by the composition, which fills all the interstices between the yarns and forms an exterior coating which is rendered uniform in thickness by passing through the die. The hose thus formed quickly dries sufficiently on its surface to enable it to be handled or reeled and is then vulcanized. The vulcanizing process thus renders the combined covering of textile web and rubber composition thoroughly homogeneous.

Prior to this invention it has been customary to braid the yarns dry onto the lining tube, and then to run in a sheet of dry rubber known as "friction," which is wide enough to encircle the hose and slightly overlap, and then to braid the second web around this friction. In vulcanizing, the layer of friction cements itself to the braided webs on both the inner and outer sides, but does not materially impregnate the yarns thereof. The overlapping friction also is irregular, and if too wide will make the finished hose unsymmetrical because of the double thickness of rubber along one side. Another method that has been to some extent practiced, is to carry the hose having the first ply or plies braided or woven on the inner tube, through a trough of rubber cement or composition, whereby to coat the textile web, and then to dry the hose thus coated and then braid on the final web of dry yarns, and finally to vulcanize the hose. With this method if a coating is applied of sufficient thickness to properly impregate the webs, the hose becomes too sticky to handle for the final braiding operation, so that it is necessary in practice to apply the coating sufficiently thin to enable it to quickly dry, in order that the hose may be reeled or coiled and handled into the braiding machine for the last braiding operation; and the coating thus applied is insufficiently thick to properly impregnate and unite the last or outer braided web.

The method provided by the present invention has the advantage over both the former methods that the fabric layers are more thoroughly impregnated with the rubber composition, and are more securely united and become after vulcanization more homogeneous. It also has the advantage that the impregnation is accomplished in the same operation as the braiding, thereby saving one handling or manipulation of the hose. As compared with the treatment in a trough of rubber cement or composition, the expense of carrying the hose through this trough and subsequently drying it is avoided. By passing the yarns through the mass or bank of accumulated composition, they are individually impregnated before being braided or woven together to form the web, while at the same time the rubber coating is applied both interiorly and exteriorly to the web, in a manner more thorough than has previously been attained.

The accompanying drawings show a braiding machine fitted with the necessary attachments for the practice of the present invention.

Figure 2:
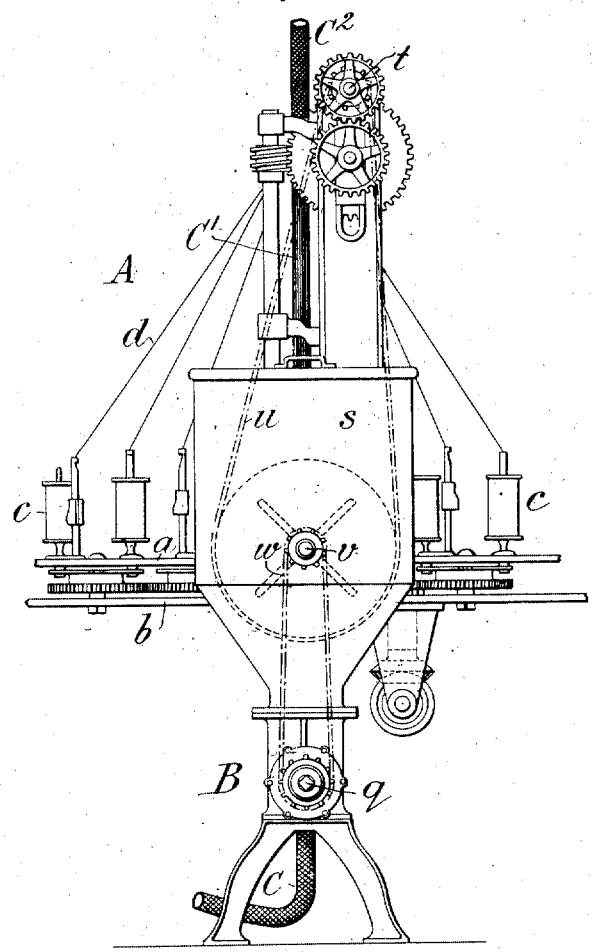

Figure 1 is a vertical mid-section of a suitable type of braiding machine the attachment thereto being shown in vertical section; Fig. 2 is a side elevation of the impregnating or coating attachment and of the braiding machine viewed from the side of the machine on which the tank of rubber composition is located.

Referring to the drawings, let A designate as a whole the braiding machine, and B the rubber coating device. The braiding machine being well known, is not shown in detail and requires no description other than to state that $a$ and $b$ are the upper and lower plates between which the necessary gearing for driving the bobbins is arranged, and $c\ c$ are the bobbins, all of which may be of the usual construction. The yarns $d\ d$ from the bobbins converge, forming a shed, in the well known manner. In the machine shown power is applied to a driving pulley $e$ which through a clutch $f$ is coupled to the main shaft $g$ from which power is taken through gears for driving the elements of the braiding machine.

C is the hose which is carried up through the center of the braiding machine in the usual manner, except that it first passes through the coating device. This device comprises essentially a coating chamber $h$ to which the rubber composition or "friction dough" is fed under suitable pressure in any convenient way, the hose being properly centered by passing through a thin tube or mandrel $i$ which is centered by adjusting screws $j\ j$, and which terminates just beneath a ring die or wiper $k$ which removes any excess of composition from the hose. The emerging coated hose $C'$ passes up through the machine, being extended through the air for a sufficient distance to partially dry the coating, and which on reaching the braiding point or point of convergence of the shed, has the outer web braided upon it, and then passes up through a central guiding and wiper die $m$, which wipes off the excess of composition from the exterior of the hose and spreads what remains uniformly over the outer web, the hose $C^2$ thus coated then passing a suitable distance through the air to dry off the outer composition which would render it too sticky, and b ing then reeled or coiled in any usual way; after which it may receive any desirable outer wrapping or may be at once taken to the vulcanizing oven and vulcanized.

The upper die $m$ is so proportioned to the lower die as to wipe off a certain amount of the rubber composition or dough and cause the latter to bank up or accumulate in a mass or bank shown at $p$, forming at this point a coherent cake of rubber dough adhering to the hose and surrounding the converging yarns, so that as the latter are carried by the bobbins they are forced to cut their way through this mass, so that the latter is constantly being stirred and rolled with the motion somewhat resembling that of a "vortex ring," whereby continually fresh surfaces are presented, and whereby the yarns in passing through the constantly stirring mass are thoroughly impregnated with the rubber composition.

For feeding the rubber composition or friction dough to the coating chamber $h$, any suitable propelling mechanism may be provided, that shown comprising a screw conveyer $q$ turning in a tubular shell $r$ of suitable length which at one end draws the dough from the bottom of a hopper $s$, and at the other end propels it into the chamber $h$. For rotating this conveyer shaft $q$, power may be taken from any suitable point, as for example from a sprocket wheel on an upper shaft $t$ of the braider, which through a chain $u$ drives a sprocket wheel on a transverse shaft $v$, which passes through the hopper $s$ and preferably has stirring arms upon it within the hopper, as shown, whereby the mass of dough in the hopper is kept stirred and agitated, and from this shaft another sprocket chain $w$ is arranged to drive the conveyer shaft $q$. Other propelling or forcing means, however, for keeping a constant flow of the dough under suitable pressure into the coating chamber $h$ may be substituted.

The method and apparatus described are applicable not only to coating hose with rubber composition or friction dough, but to any other plastic coating that it may be desired to apply.

The invention may be modified in various respects within the skill or judgment of the operator, and is not confined to the special apparatus, or to the precise details of manipulation described. The invention is applicable not only to hose but to any like or analogous product requiring a tubular textile envelop, such for example as the insulating of electric wires. For hose, the inner or lining tube or core might in some instances be omitted and the tubular web be braided or woven upon any suitable support in the well known manner; in such case it is only necessary to provide for supplying the plastic material to the point beneath the wiping die $m$ at which the yarns converge to form the web.

As a modification of my invention the die $m$ might be set a little higher than shown, with the effect that the mass $p$ would be above the point at which the yarns converge, so that the yarns forming the textile web would remain dry until laid upon the core to form the web, their impregnation being completed immediately afterward by the passing of the web through the mass $p$ of surplus coating material.

I am aware that in insulating electric wires, the wire with or without a braided covering upon it has been passed downwardly through a funnel-shaped cup containing a thin liquid, the yarns forming the braided covering being caused to converge upon the wire within the liquid in such cup whereby to impregnate the braided covering with such liquid. My invention is distinguished from this in that the coating material is in semi-solid or dough-like condition, its coherence being such as to maintain itself upon the core and against a wiping die without the aid of any hopper receptacle and even against the effect of gravity.

I claim as my invention:—

1. The process of making hose or the like, which consists in forming a tubular textile web while maintaining around it a mass of dough-like plastic material through which the yarns pass on their way to form the web, whereby the yarns are impregnated and the web is coated with such material.

2. The process of making hose or the like, which consists in forming a tubular textile web, while maintaining around it a mass of dough-like plastic rubber composition through which the yarns pass on their way to form the web, whereby the yarns are impregnated and the web is coated with said material.

3. The process of making hose or the like, which consists in forming a tubular textile web, while maintaining around the web a mass of plastic material, whereby the web is impregnated, and removing the excess of such material from the web.

4. The process of making hose or the like, which consists in applying a dough-like plastic coating upon a tubular core and immediately forming thereon a textile web the yarns of which are impregnated by such coating, and removing an excess of such coating from the web.

5. The process of making hose or the like, which consists in applying a plastic coating upon a tubular core, then forming thereon a textile web which is thereby penetrated by such coating, and finally removing an excess of such coating from the exterior of the web.

6. The process of making hose or the like, which consists in passing a tubular core through a mass of plastic material, removing an excess of such material to leave a uniform coating, then forming thereon a textile web whereby the coating penetrates such web, and then removing from the exterior of the web an excess of coating material.

7. An apparatus for making hose or the like, comprising means for forming a tubular textile web, and means for maintaining a mass of dough-like plastic material around said web whereby to coat the web.

8. An apparatus for making hose or the like, comprising means for feeding a core upwardly, means for applying a plastic material to said core, means for subsequently forming a tubular textile web around said core, whereby it is penetrated by the plastic coating, and means for finally removing an excess of such coating from the exterior of the core.

9. An apparatus for making hose or the like, comprising means for forming a tubular textile web, means for feeding the same upwardly, and means for applying a plastic material to the yarns thereof immediately before they are united in the web.

10. An apparatus for making hose or the like, comprising means for forming a tubular textile web, means for feeding the same upwardly, and means for maintaining around the web a mass of plastic material through which the yarns pass on their way to form the web.

11. An apparatus for making hose or the like, comprising means for forming a tubular textile web, a wiping die through which said web passes, and means for applying plastic material to the hose before reaching said die, whereby the excess thereof is removed by the die, and a mass of such material maintained against the die.

12. An apparatus for making hose or the like, comprising means for forming a tubular textile web upon a core, means for applying a coating of plastic material upon such core, and a wiping die through which the hose passes, adapted to remove an excess of such plastic material from the web.

13. An apparatus for making hose or the like, comprising means for forming a tubular textile web upon a core, and means for preliminarily coating said core with plastic material, comprising a coating chamber, a tubular guide for directing the core through said chamber, and a wiping die at the exit from said chamber for removing excess of material.

14. An apparatus for making hose or the like, comprising means for forming a tubular textile web upon a core, and means for preliminarily coating said core with plastic material, comprising a coating chamber, a tubular guide for directing the core through said chamber, and a wiping die at the exit from said chamber for removing excess of material, a hopper for the coating material, and a conveyer for forcing the material from said hopper into said chamber.

In witness whereof, I have hereunto signed my name in the presence of two subscribing witnesses.

HENRY ZENAS COBB.

Witnesses:
WILLIAM H. TUCKER,
AUGUSTUS R. TAFT.